INVENTOR
Frederick M. Guy.
BY Dike, Calver & Gray
ATTORNEYS.

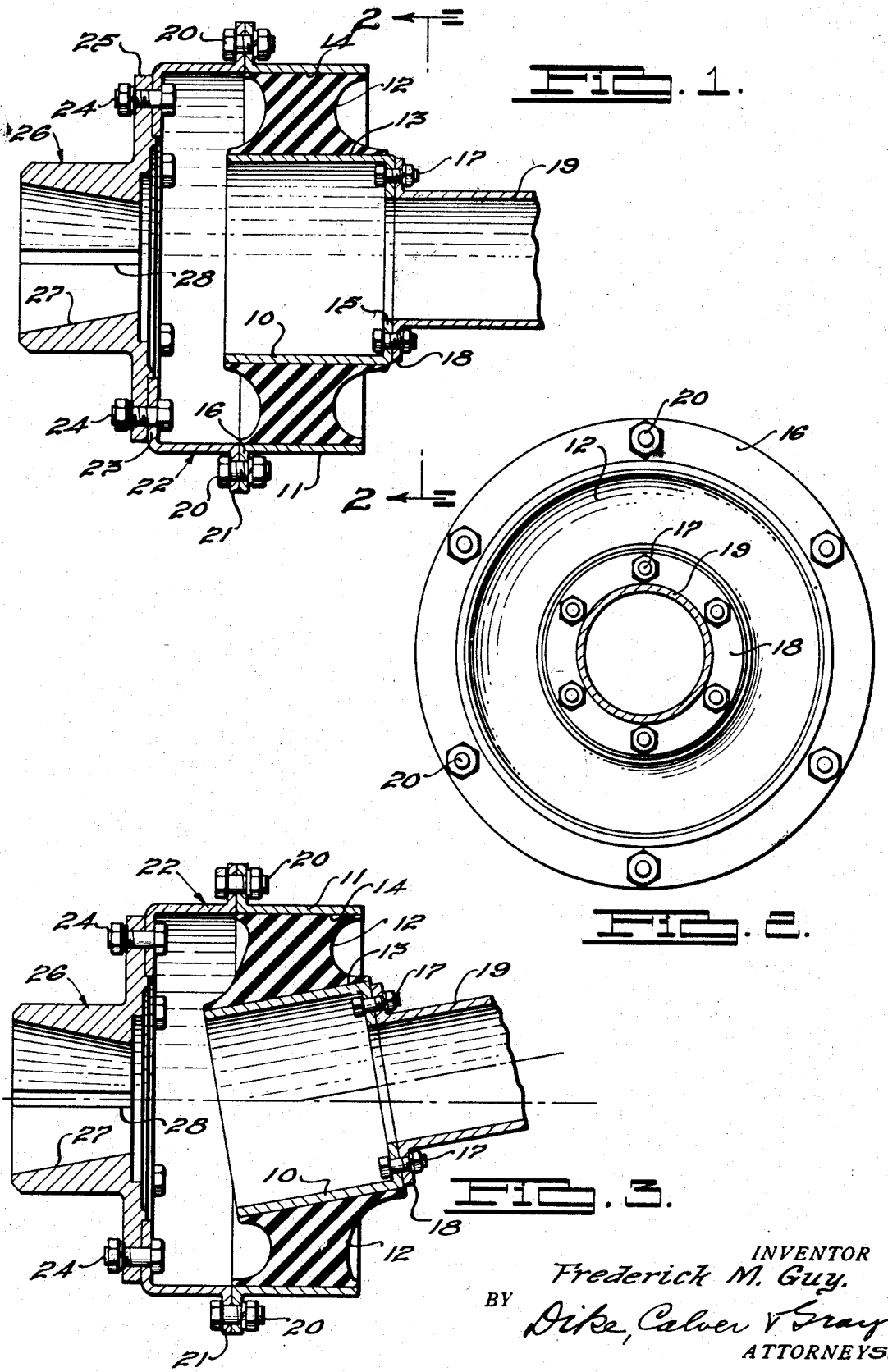

Patented Jan. 3, 1939

2,142,784

UNITED STATES PATENT OFFICE 2,142,784

UNIVERSAL COUPLING

Frederick M. Guy, Detroit, Mich., assignor to Guy and Murton, Incorporated, Detroit, Mich., a corporation of Michigan Application October 8, 1936, Serial No. 104,626

2 Claims. (Cl. 64—13)

This invention relates to universal couplings and in particular to universal couplings in which a resilient member is interposed between the driving shaft and the driven shaft in order to provide a flexible driving connection between the shafts which will permit angular, parallel and longitudinal misalignment of the shafts by distortions occurring in the resilient member.

An object of the present invention is to provide a universal coupling with resilient driving connection between the shafts, which coupling is simplified in its construction and economical to manufacture.

Another object of the invention is to provide a universal coupling in which the resilient driving connection between the shafts is effected by means of a single resilient member.

A further object of the invention is to provide a universal coupling having a resilient connection between the shafts and in which the connection securing the resilient member to the metal parts is effected by surface bonding, which bonded surfaces are so arranged that the unit shearing stress is substantially uniform along the whole extent of the bonded surfaces.

Another object of the invention is to provide a resilient universal coupling in which the resilient member interposed between the shafts is formed to provide a substantially equal mass of resilient material at the points where working occurs in the mass during operation of the device and to provide substantially increased surfaces adjacent the center and peripheral portions thereof to insure an adequate area being available for the bonding of the resilient member to the connected parts of the coupling.

Another object of the invention is to provide a resilient universal coupling in which the resilient member is securely held in the assembly so as to prevent any frictional movement between connected parts and all relative movements occurring between the connected parts are yieldingly resisted by the resilient member and accommodated by distortion thereof whenever the forces causing such movements exceed the resistance forces of the resilient member.

Another object of the invention is to provide a resilient universal coupling which is capable of transmitting loads imposed thereon without substantial losses occurring in the coupling.

Other objects and advantages of this invention will appear in the following description and appended claims, reference being had to the accompanying drawings forming a part of this specification wherein a preferred embodiment of the present invention is illustrated.

In the drawings, wherein like reference characters designate corresponding parts in the several views, Fig. 1 is a sectional view of a coupling embodying the present invention, section being taken through the longitudinal axis of the coupling;

Fig. 2 is an end view, partly in section, of the structure shown in Fig. 1 looking in the direction of the arrows, section being taken on the line 2—2 of Fig. 1;

Fig. 3 is a longitudinal sectional view of the coupling showing the position of the respective elements of the coupling when the connected shafts are angularly misaligned, that is, when the axes of the connected shafts form an angle of less than 180°;

Figure 4:
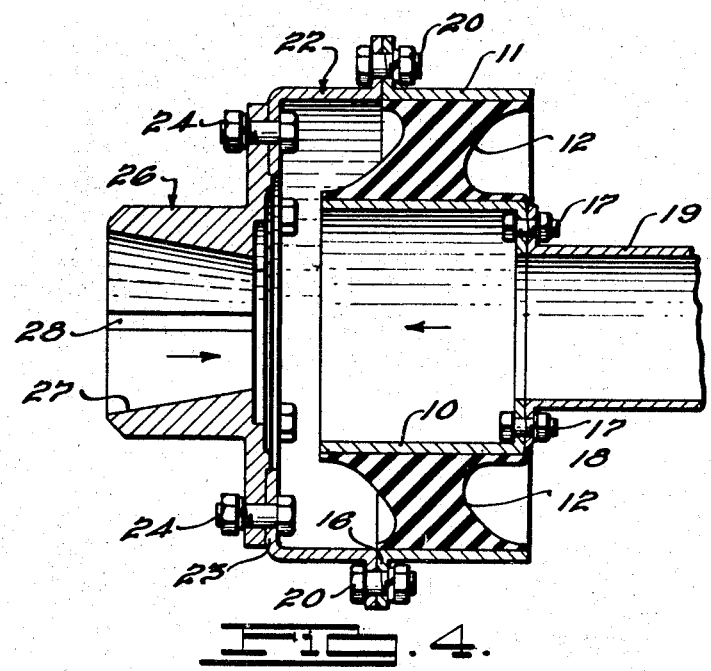
Fig. 4 is also a longitudinal sectional view showing the respective positions of the elements of the coupling when the connected shafts are subjected to an end thrust with the axes of said shafts remaining coincident.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A coupling constructed in accordance with the present invention comprises generally two concentric shells or cylinders provided with means for securing the same to the driving and the driven shaft, respectively. The shells are connected with each other by means of a body portion of a suitable resilient material, such as rubber, which is in the form of concentric ring extending between the shells and bonded to the surfaces thereof. Misalignment of the connected shafts is permitted by relative movement of the connected shells and is accommodated by distortion of the resilient ring. Any suitable means for connecting said shells to the shafts, such as bolting, riveting, welding and the like may be employed in connection with the present invention, and I do not desire to be limited to any particular form of connecting means, the invention herein residing particularly in the features of construction and operation of the coupling.

Referring to the drawings, the embodiment of the invention shown therein by way of example comprises two concentric metal shells or cylinders 10 and 11, the shell 10 being disposed within the shell 11. Said shells are connected by means of a resilient body portion 12, in this instance formed of rubber which is bonded to the adjacent cylindrical surfaces 13 and 14 of the shells 10 and 11. The respective diameters of the shells 10 and 11 are so chosen that the resilient body portion 12, interposed between the shells 10 and 11, is of sufficient size to carry the intended maximum loads for which the particular coupling is designed, and at the same time to permit sufficient displacement of the shafts to accommodate the misalignments thereof.

One of the important features of the present invention is the shape of the rubber portion 12. Since the magnitude of resistance per unit area to the shear resulting because of the torque transmitted by the bonded surfaces is rather limited, the area of said surfaces is greatly increased by providing wide footing or base portions at 13 and 14 for securing the rubber portion 12 to the shells 10 and 11. By the construction here shown, the wide footings or base portions are provided without impairment of the resiliency desired in the body portion of the resilient member. In addition, the respective lengths of the shells 10 and 11 are so selected that the area of bonded surface of rubber is substantially the same in both of said shells 10 and 11. The ends or faces of the rubber portion or bushing 12 are curved in order to eliminate excess of rubber in the bushing, and to impart to said bushing such shape as to permit an easier self-adjustment or flowing of the rubber mass when the bushing is distorted.

Since the greatest mass or volume of rubber is affected least by forces imposed thereon, the lesser masses or volume thereof are subjected to a localization of these forces. Consequently if a mass or volume of rubber having unequal masses or volume at different points is utilized as the resilient connecting element in a construction embodying the present invention, excessive wear and unbalance of the structure will result from the localization of the forces in the weakest parts of the rubber.

Such a condition exists if the resilient element utilized is in the form of a circular disk having substantially plane parallel faces, for the amount of rubber subjected to working progressively increases with each increasing circumference of the disk taken on points radially disposed from the center. Thus working strains are centralized in the rubber at a point or points adjacent the connection with the center member. In the present invention this condition is recognized and the problem is solved by the provision of the concentric grooves formed in the faces of the disk, which grooves are of such depth contour that there is a substantially uniform volume or mass of rubber subjected to working at any point within said grooves, so that a predetermined amount of rubber is subjected to working at all times and this amount is sufficient to accommodate all normal and expected uses of the joint.

The shells 10 and 11 are arranged substantially parallel to the connected shafts and are affixed thereto by any suitable means. In the present embodiment of the invention, said connecting means are exemplified by a flange 15 of the shell 10 and a flange 16 of the shell 11. The flange 15 is secured by means of a plurality of bolts 17 to a flange 18 of a tubular shaft 19, said shaft being one of the connected shafts. The flange 16 of the shell 11 is secured with the aid of a plurality of bolts 20 to the flange 21 of a cylindrical adapter 22 having inwardly projecting flanges 23 secured by means of a plurality of bolts 24 to flanges 25 of a hub 26. The tail end of said hub is provided with a tapering hole 27 concentric with the axis of the coupling, which hole is adapted to receive a tapering end of the second shaft (not shown). The slot 28 is provided for the purpose of securing said tapering end of the shaft to the hub 26 with the aid of a suitable key. It is to be understood, however, that both of the connected shafts may be tubular and secured to the coupling in a way similar to that of the shaft 19, or both may be solid and secured to the coupling with the aid of a hub, substantially similar to the hub 26.

It will be clear now in view of the foregoing that with the aid of my novel universal coupling it is possible to connect two abutting shafts and to provide for their smooth operation in conditions of changing angular speed and various types of misalignments with respect to each other. With the aid of a single coupling only it is possible to achieve a substantially uniform angular velocity of the driven shaft in spite of the fact that the angular velocity thereof tends to decrease and to increase alternately four times during a single revolution.

Figure 5:
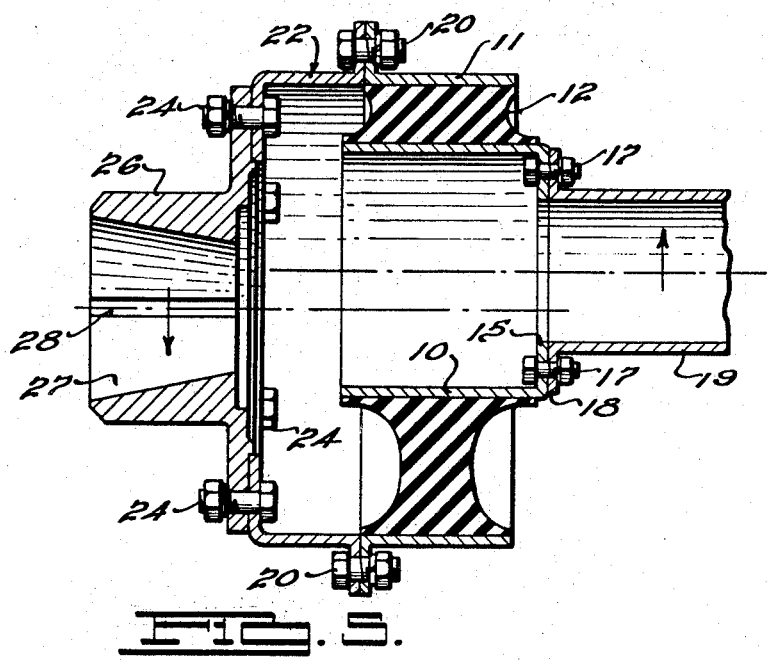
Fig. 5 shows in section the respective positions of the elements of the coupling when the connected shafts are transversely offset with respect to each other, their axes remaining parallel.

Fig. 3 illustrates the relative positions of the elements of the coupling and the distorted shape of the rubber ring 12 when the longitudinal axes of the connected shafts form an angle. It will be seen that in such a condition the ring 12 easily adapts itself to the axial misalignment of the shafts, and the same may operate smoothly without surface friction between the assembled parts causing a heating of the rubber. Fig. 4 shows the relative positions of the elements of the coupling and the shape assumed by the ring 12 when the shafts are subjected to an end thrust, their axes remaining coincident. Fig. 5 illustrates the axial offset condition of the coupling, with the axes of the connected shafts remaining parallel. Although in actual operation conditions any combination of the above described misalignments may occur, the same is equally successfully provided for by the construction of my novel coupling.

Thus, considered from one of its broader aspects, my invention contemplates providing a novel universal coupling in which any combination of operative misalignments of the connected abutting shafts is permitted by distortion of a resilient connection between said shafts, said connection being made in the form of a bushing bonded to two concentric shells secured to the respective ends of the connected shafts.

I claim:

1. In a universal coupling for connecting drivingly two abutting shafts, an outer cylindrical shell adapted to be detachably secured to the end of one shaft concentrically therewith, an inner cylindrical shell of a smaller diameter than said outer shell, said inner shell being detachably secured to the end of the other shaft and being of a larger diameter than the end of said other shaft, and an annular rubber member provided between said shells and bonded to the surfaces thereof, said rubber member being disposed entirely outside of the space defined by the geometric continuations of the abutting ends of the connected shafts.

2. In a universal coupling for connecting drivingly two abutting shafts, an outer cylindrical shell adapted to be detachably secured to the end of one shaft concentrically therewith, an inner cylindrical shell of a smaller diameter than said outer shell, said inner shell being detachably secured to the end of the other shaft and being of a larger diameter than the end of said other shaft, and an annular rubber member provided between said shells and bonded to the surfaces thereof, said rubber member being disposed entirely outside of the space defined by the geometric continuations of the abutting ends of the connected shafts, the length of the inner shell being greater than that of the outer shell in order to provide a substantially uniform shearing stress at the bonded surfaces of said shells.

FREDERICK M. GUY.